June 1, 1926.

L. S. SEYBOLD

MOLDING MACHINE

Filed Jan. 28, 1925

Inventor
L. S. Seybold,
By
Attorney

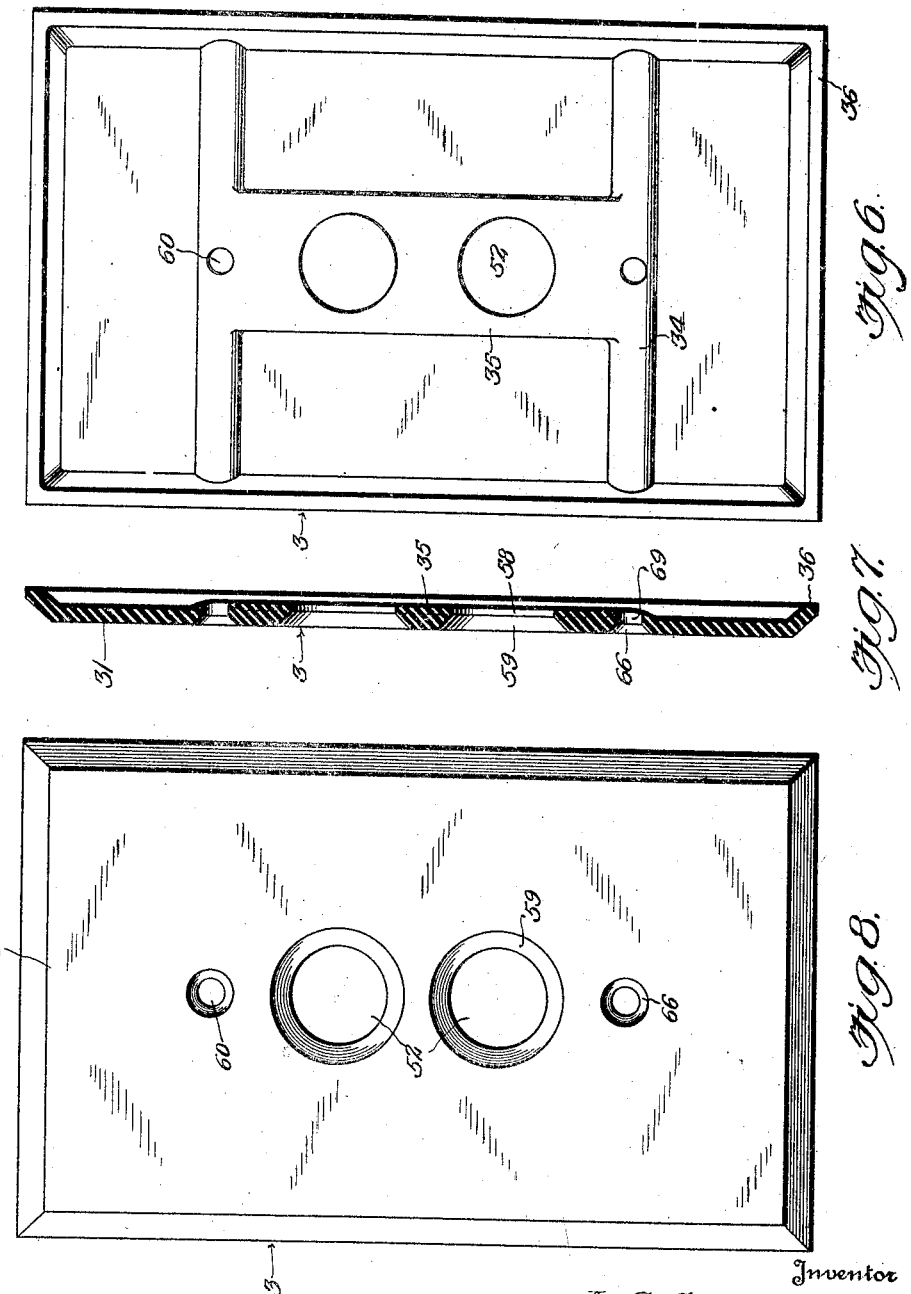

Patented June 1, 1926.

1,587,431

UNITED STATES PATENT OFFICE.

LAWRENCE S. SEYBOLD, OF JACKSON, MICHIGAN, ASSIGNOR TO REYNOLDS SPRING COMPANY, OF JACKSON, MICHIGAN.

MOLDING MACHINE.

Application filed January 28, 1925. Serial No. 5,375.

The invention relates to a machine for molding switch plates.

The object of the present invention is to improve the construction of molding machines and to provide a simple, practical and efficient molding machine of strong durable and comparatively inexpensive construction adapted for molding simultaneously, a plurality of switch plates of plastic insulating material such as phenolic condensation product and other compositions and capable of enabling the material prior to the application of pressure to be heated to the desired temperature and maintained at such temperature during the molding operation and of reducing the temperature and chilling the material to set the same after molding.

Another object of the invention is to provide a molding machine of this character adapted to be operated by a hydraulic or other press and capable in the opening movement of the press of ejecting the molded switch plates from the molds or dies.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:—

Figure 6 is a reverse plan view of one of the switch plates.

Figure 7 is a longitudinal sectional view of the same.

Figure 8 is a plan view of the switch plate.

Figure 1:
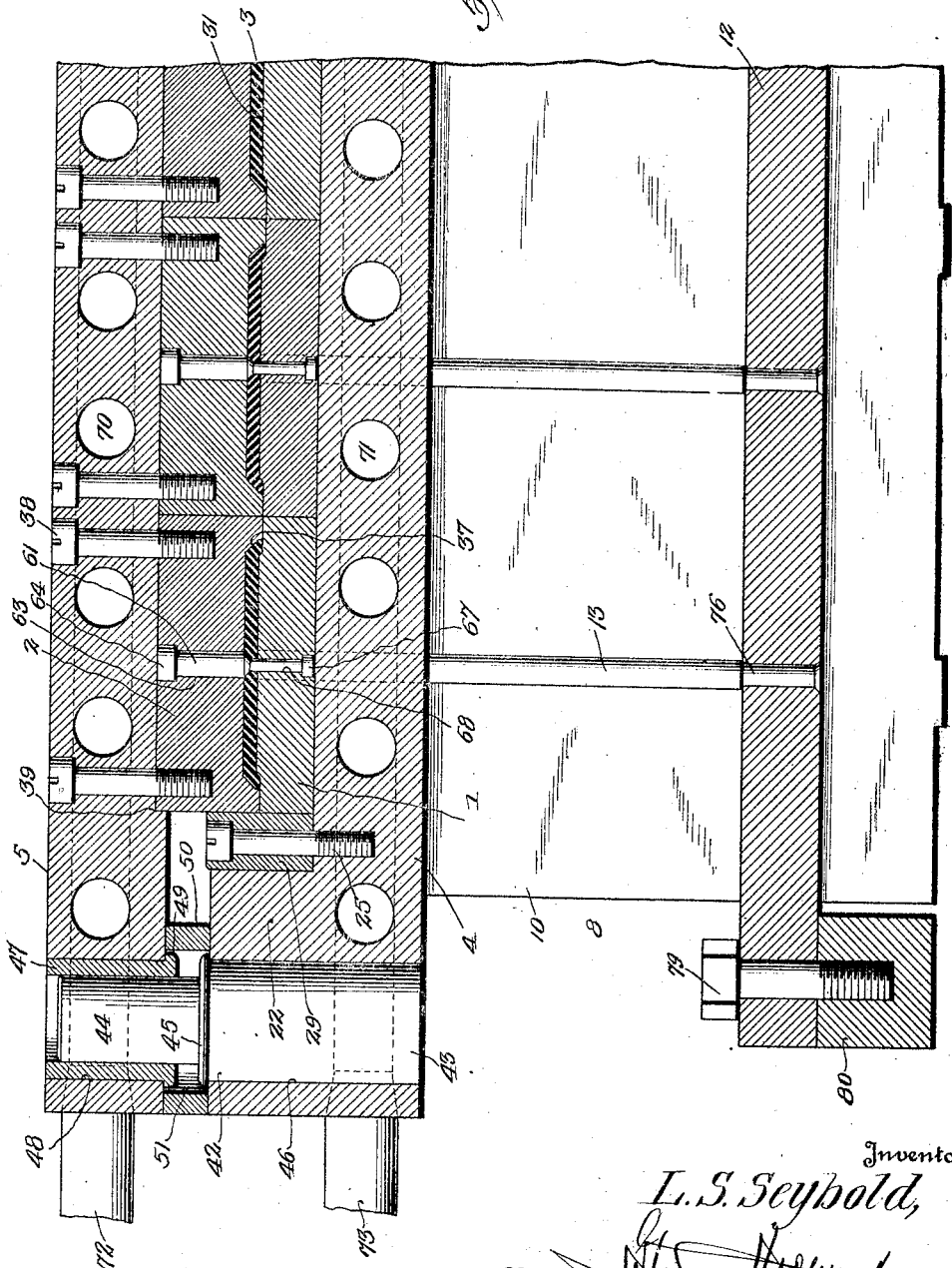
Figure 1 is a longitudinal sectional view of a portion of a switch plate molding machine constructed in accordance with this invention.
Figure 2:
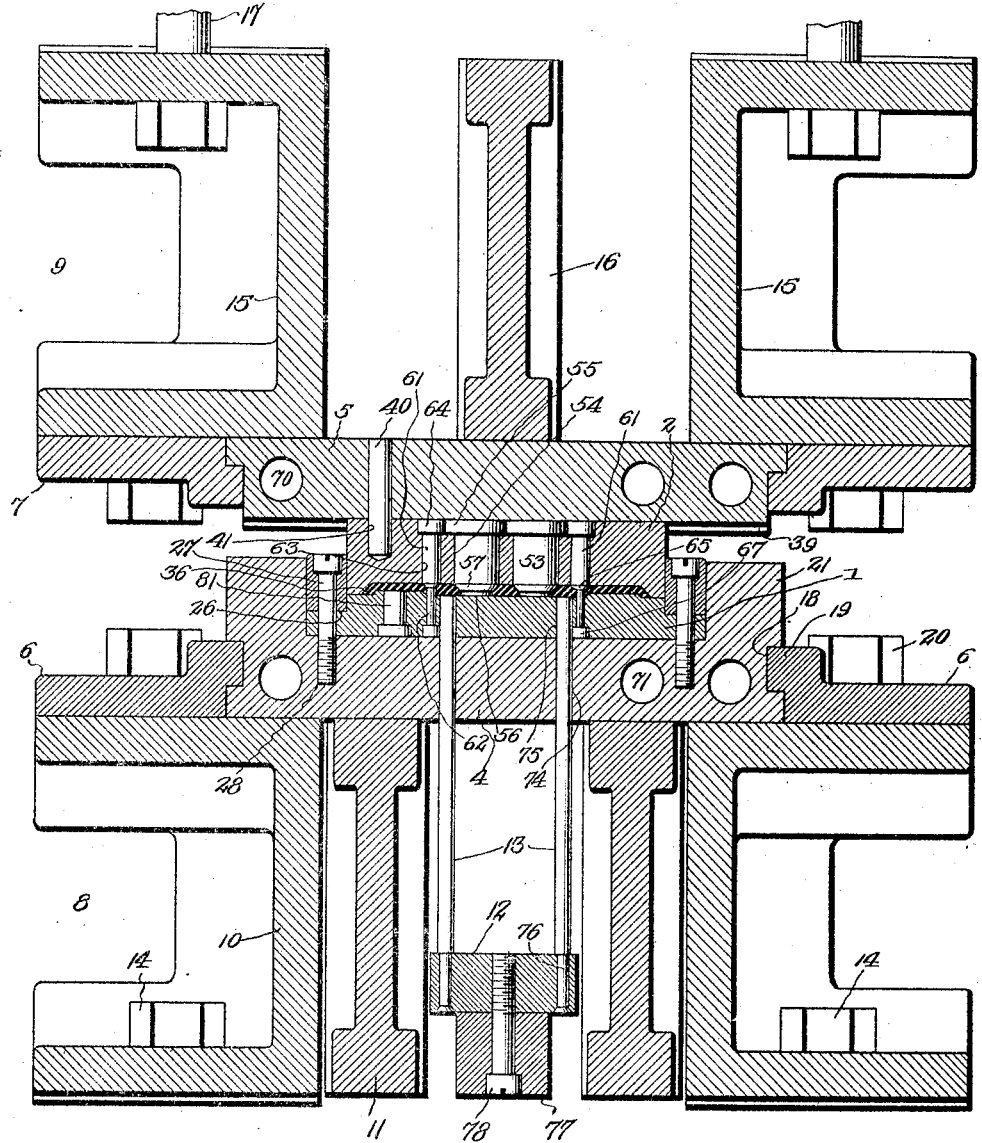
Figure 2 is a transverse sectional view of the same.
Figure 3:
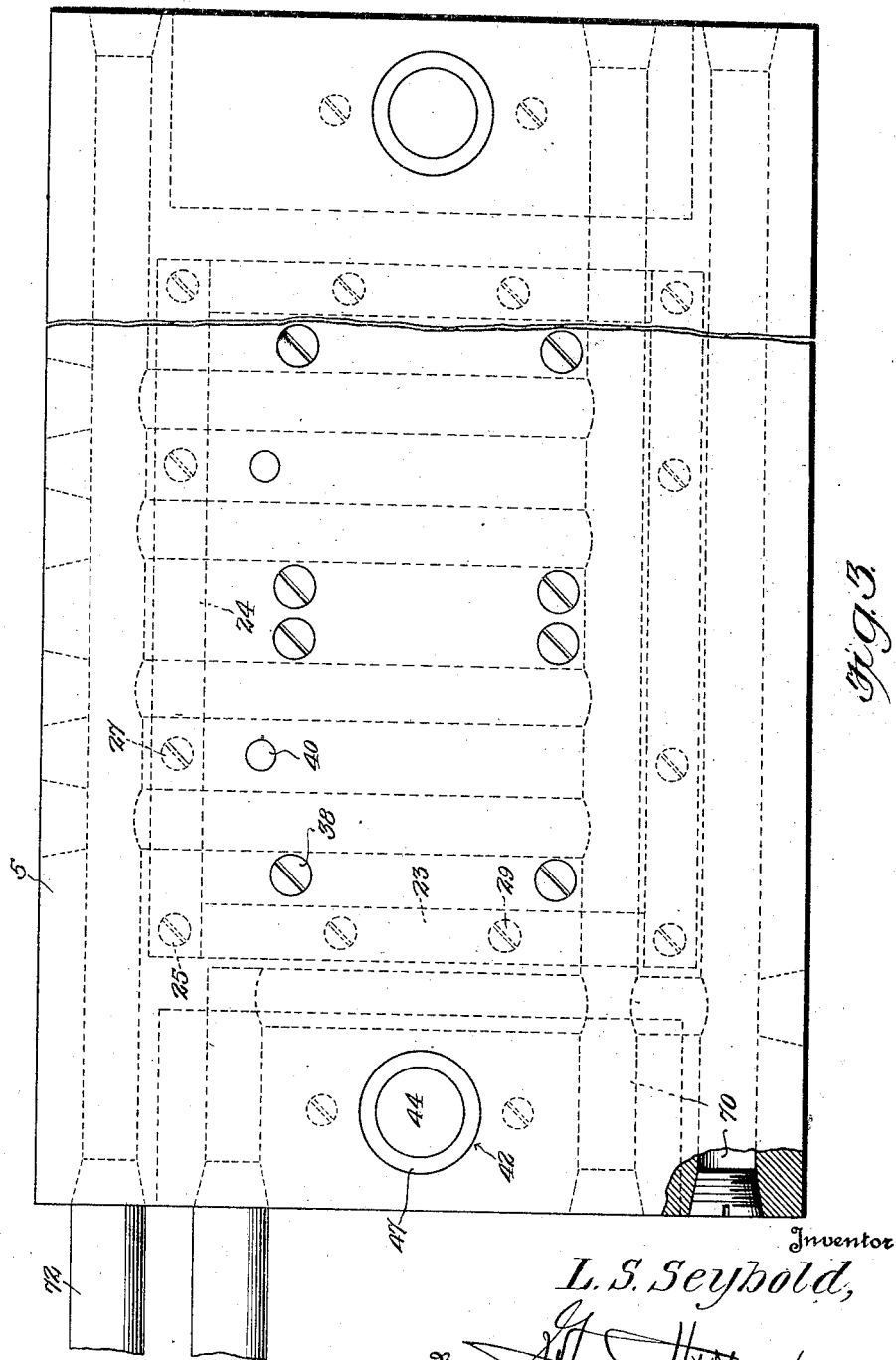
Figure 3 is a plan view partly in section of the upper radiator plate.

In the accompanying drawings in which is illustrated the preferred embodiment of the invention, the switch plate molding machine comprises in its construction, a series of lower die elements 1 and a series of cooperating upper punch elements 2 cooperating with the die elements to shape the upper and lower faces of switch plates 3 as clearly illustrated in Figs. 1 and 2 of the drawings. The molding machine illustrated in the drawings is designed for molding simultaneously four switch plates but the number may be varied as will be readily understood and the lower die members 1 and the upper punch elements 2 are mounted respectively on lower and upper radiators 4 and 5, which are secured by lower and upper clamping plates 6 and 7 to lower and upper grids or frames 8 and 9, which are in practice mounted respectively on the lower and upper platens of a hydraulic or other press. The lower grid or frame 8, which may be constructed in any desired manner comprises the side channel members 10, and intermediate members 11, preferably consisting of I-beams and spaced apart at the center of the frame to provide an intervening space for a vertically movable stripper plate 12 carrying knock-out rods 13 arranged at intervals for ejecting from the lower die members, the molded switch plates which in practice shrink upon the said lower die members when the material sets. The lower frame or grid 8, may be secured by bolts 14 or any other suitable means to the lower platen of the press and the upper frame or grid 9 preferably consists of side channel members 15 and a central frame member 16 preferably consisting of an I-beam. The upper grid or frame may be of any other design or construction and it is designed to be secured by bolts 17 or else other suitable devices to the upper platen of the press.

Figure 4:
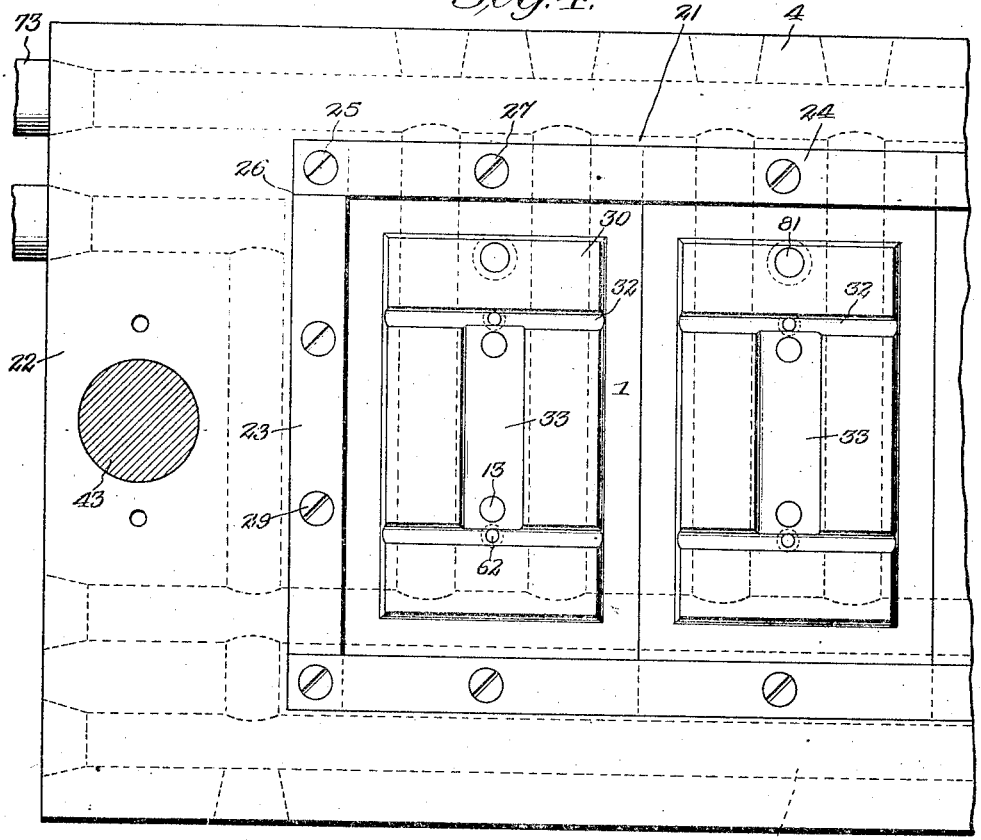
Figure 4 is a similar view of a portion of the lower radiator plate and the die elements carried by the same.
Figure 5:
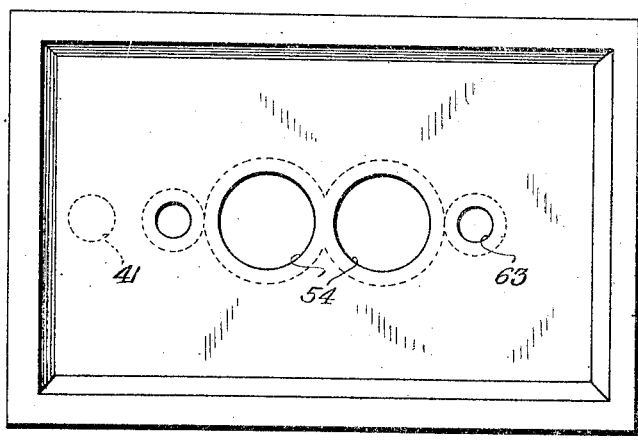
Figure 5 is a detail view of one of the upper punch elements.

The lower radiator which consists of a flat plate having longitudinal and transverse passages for a temperature controlling medium is provided at opposite sides with longitudinal grooves 18 for the reception of projecting flanges 19 of the clamp, which are secured by bolts 20 to the lower grid or frame 8 and the said flanges 19 extend upwardly from the clamping plates and inwardly toward the lower radiator and enter the groove 18 thereof whereby the lower radiator is securely gripped at opposite sides and firmly fastened upon the lower grid or plate 8. The lower radiator is provided at its upper face with a seat formed by side and end walls 22 and receiving the lower die elements and also a frame for securing the lower die elements in the recess or seat formed by the enclosing side and end walls 21 and 22. The die clamping frame is composed of transverse end bars 23 and longitudinal side bars 24, and having their ends secured by screws 25, in recesses 26 in the terminals of the end bars 23. The recessed terminals of the end bars 23 support the side bars 24 above and in spaced relation with the upper face of the lower radiator and the die members or elements 1, extend across the upper face of the lower radiator and are recessed at 26 at the upper faces of their ends to form projections to fit beneath the side bars of the clamping frame and to provide shoulders to fit against the inner side faces of the side bars of the clamping frame, as clearly illustrated in Fig. 2 of the drawings. The die elements 1 are further secured in position by screws or bolts 27 which pierce the side bars 24 of the clamping frame and also the recessed terminals of the die elements and engage threaded sockets 28 in the radiator 4. The end bars 23 are arranged upon the upper face of the radiator 4 and fit against the end walls 22 thereof as clearly shown in Fig. 1 of the drawings and are secured to the lower radiator 4 by means of screws or bolts 29. The die elements 1 are detachably mounted upon the lower radiator by means of the clamping frame and the screws and they are adapted to be readily removed and may be replaced by die elements for forming switch plates of a different construction or configuration from that illustrated in Figs. 6 to 8 inclusive of the drawings. The die elements, as clearly illustrated in Fig. 4 of the drawings have raised bevelled portions 30 and are adapted to shape the interior and lower face of the switch plate 31. The raised portion 30 is provided with transverse grooves 32 and a central longitudinal groove 33 for forming transverse or longitudinal ribs or enlargements 34 and 35 on the lower face of the switch plate interiorly thereof within a marginal flange 36 formed by the bevelled side and end edges of the raised portion 30 and the cooperating punch member 2. The cooperating punch member 2, which is provided with a bevelled recess 37 is oblong and is secured to the lower face of the upper radiator 5 by means of bolts or screws 38 and the said upper radiator is provided in its lower face with a shallow recess 39 forming a seat for a series of the upper punch members 2 as clearly shown in Fig. 1 of the drawings. The recess 39 extends entirely across the lower face of the upper radiator 5 as clearly shown in Fig. 2 of the drawings and the upper punch members are positioned on the lower face of the radiator by dowel pins 40, and secured in perforations of the upper radiator and depending therefrom and fitting in sockets 41 in the upper faces of the punch elements 2 as clearly shown in Fig. 2 of the drawings. When the molding machine is closed, the upper punch elements fit within the clamping frame of the lower radiator and the upper and lower radiators are guided in their relative movement and maintained in proper position by means of vertical guide pins 42 composed of lower enlarged portions 43 and upper reduced portions 44 and provided with an annular flange 45 located at the junction of the lower shank portion 43 and the upper guiding portion 44. The lower shank portion is seated in an opening 46 in the lower radiator at the end wall 22 thereof and the flange 45 fits or seats upon the upper face of the said end wall 22. The upper guiding portion 44 slides in a bushing 47 secured in an opening 48 in the end portion of the upper radiator and the said bushing is provided at its lower end with an annular flange 49 to engage the lower face of the upper radiator. The bushing which slidably receives the upper portion of the guide pin, is designed to be constructed of steel or other suitable material and may readily be replaced when worn. The lower radiator is also equipped at the upper face with transverse end plates 50 having openings 51 and receiving the flanges 45 and 49 of the guide pin and the bushing when the molding machine is closed.

The push button holes 52 are formed in the switch plate by means of vertical punches 53 of substantially cylindrical formation arranged in openings 54 in the upper punch elements and provided at their upper ends with heads 55. The heads 55 are arranged in countersinks or enlargements of the openings 54 and the cylindrical punches 53 are provided with lower punching portions 56 and 57. The lower punching portion 56 is cylindrical and is formed by reducing the lower end of the cylindrical punch 53. The punching portion 57 is bevelled and connects the lower punching portion 56 with the body portion 53. The cylindrical portion 56 and the bevelled portion 57 project below the lower face of the punch element and enter the material in the operation of the molding machine and form the push button opening 54 and which has a cylindrical inner portion 58 and a flaring or bevelled outer portion 59. The openings 54 extend entirely through the punch elements 2 and the heads 55 of the cylindrical punches 53 fit against the lower face of the radiator 5.

The screw holes 60 of the switch plates are formed by upper and lower cylindrical punches 61 and 62 mounted respectively in the upper punch elements and in the lower die elements. The upper punches 61 are cylindrical and are mounted in openings 63 in the punch elements 2 and are provided at their upper elements by heads 64 arranged in enlargements or countersinks of the openings 63 and fitting against the lower face of the upper radiator. The lower ends 65 of the cylindrical punches 61 are bevelled and project below the lower face of the upper punch elements 2 and enter the material in the molding operation and form the upper or outer bevelled or flared portion 66 of the screw hole 60. The lower punches 62 which are of less diameter than the upper punches 61 are provided at their lower ends with heads 67 and are mounted in openings 68 in the lower die elements 1 and they are provided at their lower ends with heads or enlargements arranged in countersinks of the openings 68 and seated upon the upper face of the lower radiator. The lower punches 62 are of uniform diameter above the heads thereof and they project upwardly beyond the upper face of the lower die element and enter the material in the molding operation and present abutment faces to the upper punches 61 and they form the cylindrical inner or lower portion 69 of the screw holes 60 of the switch plate.

The upper and lower radiators are provided with longitudinal and transverse passages 70 and 71 and are connected with suitable pipes 72 and 73 for introducing steam into the passages of the upper and lower radiators for heating the same and the punch and die elements preparatory to the molding operation and for maintaining the punch and die elements at the desired temperature during the molding operation. The molding machine is designed for molding switch plates of plastic insulating material such as phenolic condensation product and other compositions and the material is placed in the molding machine when the same is open and while the molding machine is heated to the desired temperatures. After the material and the molding machine is heated the desired temperature, the molding is closed by the operation of the press and the material is molded to form switch plates. The steam is then withdrawn from the passages of the upper and lower radiators and cold water is introduced into the same for chilling the molding machine and causing the material to set. The material in setting shrinks upon the lower die elements and the molded switch plates are stripped from the lower die elements and ejected by means of the vertically movable knock-out rods 13, which operate in aligned openings, 74 and 75 in the lower radiator and the lower die elements as clearly shown in Fig. 2 of the drawings. The knock-out rods which are vertically disposed are preferably arranged in pairs, a pair being provided for each of the lower die elements and the lower terminal portions 76 of the knock-out rods 13 are reduced and secured in openings in the stripper plates 12 by heading the lower ends of the rods as shown or by any other suitable means. The stripper plate 12 is provided at its lower face with a longitudinal bar 77 secured to the stripper plate by screws 78 and the terminal portions of the stripper plate project beyond the longitudinal bar 77 and are secured by screws or bolts 79 to the transverse portions 80 which is a knock-out bar of the hydraulic press and is a part of the press equipment for elevating the knock-out rods 13 or projecting the same with respect to the lower die elements when the hydraulic press is opened and lowered or withdrawn with respect to the said lower die members when the hydraulic press is closed. This means for effecting a movement of the knock-out rods 13, relative to the lower die members constitutes a part of the press mechanism and as any suitable means may be employed for this purpose such as connecting the stripper platen of the press so that when the press is opened, the knock-out rods 13 will be caused to project through the lower die elements.

The die element is equipped with a punch 81 constructed similar to the said punches and designed to be provided at its upper end with a trade mark stencil or die for impressing on the molded article, the trade mark or name of the manufacturer or seller of the switch plates. This will enable any suitable indicating mark or name to be applied to the molded article.

While only one form of switch plate is illustrated in the accompanying drawings, yet it will be clear that the punches and the configuration of the punch and die elements may be changed to mold various forms of switch plates such as those of the plug and toggle type.

Molded plates are superior to the ordinary metal plates in that they will not tarnish from being touched with the fingers nor are they affected by acids or acid fumes or other agents that tarnish and corrode metals. Switch plates of molded composition also are safer for use than metal plates in that the molded composition is a perfect insulator preventing the operator from suffering discomfort should the electric circuit accidentally come in contact with the switch plate or the base to which the switch plate might be fastened.

These switch plates of molded composition are also an advantage as an aid to interior decoration. The mold composition may be made in a variety of colors and switch plates can be made from any of these colors or from any combination of colors, thereby enabling a great variety of mottled effects, etc. to be made.

It will be noted that the switch plates are reduced or recessed on the underside to a large extent. This is for the purpose of saving material and creating clearance for the various parts of the switches. The stripper plates are reinforced by ribs on the under or inner side to add strength and rigidity.

What is claimed is:—

1. A molding machine including upper and lower attachment frames, the lower attachment frame being provided between its sides with spaced frame members, upper and lower radiators carried by the attachment frames, an upper punch member secured to the upper radiator, a lower die member mounted upon the lower radiator and a vertically movable stripping plate movable in the opposite direction to the lower attaching frame operating in the space between the frame members of the lower attachment frame and contained within the latter and having knock-out rods passing through the lower radiator and the die element for removing the molded material from the latter.

2. A molding machine including upper and lower attachment frames designed to be secured to the platens of a press and having spaced side members, an upper attachment frame having a centrally arranged frame member and the lower attachment frame being provided between the sides with spaced members, upper and lower radiators carried by the said frames, an upper punch element secured to the upper radiator, a lower die element mounted upon the lower radiator and a stripping plate contained within the lower attachment frame and movable vertically in the space between the said members of the lower frame in the opposite direction to the vertical movement of the said lower frame and having knock-out rods passing through the lower radiator and the die element for removing the molded material from the latter.

3. A molding machine including upper and lower attachment frames designed to be secured to the upper and lower platens of a press and having spaced sides, the upper attachment frame being provided between its sides with a centrally arranged frame member and the lower attachment frame having spaced frame members located between its sides, an upper punch element carried by the upper attachment frame, a lower die element carried by the lower attachment frame, and a stripping plate contained within the lower attachment frame and movable vertically in the space between the lower frame in the opposite direction to the movement of the said lower attachment frame members and having knock-out rods passing through the lower die element and arranged to remove the molded material from the same.

4. A molding machine including upper and lower attachment frames, upper and lower radiators fitted against the said frames composed of spaced members, clamping plates detachably secured to the spaced members of said frames at opposite sides of the radiators and having portions engaging the said radiators and securing the same to the attachment frames, an upper punch element carried by the upper radiator and a lower die element mounted upon the lower radiator.

5. A molding machine including upper and lower attaching frames composed of spaced members, upper and lower radiators fitted against the frames and provided at opposite sides with recesses, clamping plates secured to the spaced frame members located at opposite sides of the radiator and having projecting flanges engaging the recesses of the radiators and securing the same to the attaching frames, an upper punch element carried by the upper radiator and a lower die element mounted upon the lower radiator and cooperating with the punch element.

6. A molding machine including a lower radiator provided with side and end walls forming a seat, a die element fitting the seat of the lower radiator, an upper radiator, a punch element secured to the upper radiator and extending into the space inclosed by the said walls during the molding operation, and cooperating with the said die element.

7. A molding machine including a lower radiator having a seat and provided with integral side and end walls surrounding the said seat, a plurality of die elements mounted upon the said seat and enclosed by the said walls, clamping means carried by the lower radiator and engaging the die elements, an upper radiator and a plurality of punch elements secured to the upper radiator and cooperating with the die elements and extending into the space enclosed by the said walls during the molding operation.

8. A molding machine including a lower radiator having integral side and end walls, a clamping frame mounted upon the said radiator within the space inclosed by the said walls, and having side and end bars, a die element extending across the said frame and engaging with opposite bars thereof and secured by the same to the lower radiator and an upper punch element cooperating with the lower die element and arranged to extend within the clamping frame and into the space inclosed by the said walls during the molding operation.

9. A molding machine including a lower radiator having integral side and end walls, a rectangular clamping frame mounted upon the radiator and located within the space inclosed by the said walls and composed of side and end bars, the side bars being supported above and in spaced relation to the radiator, a plurality of lower die elements mounted upon the lower radiator and extending beneath the side bars of the said frame and clamped by the same, and upper punch elements arranged to extend within the frame and within the space inclosed by the said walls during the molding operation to cooperate with the lower die elements.

10. A molding machine including a lower radiator having integral side and end walls, a clamping frame mounted upon the lower radiator and located within the space between the said walls and composed of end bars having recessed terminals and side bars mounted in the recesses of the end bars and supported above the lower radiator in spaced relation with the same, a lower die element mounted upon the lower radiator and having its terminal portions extending beneath the side bars of the clamp frame and secured by the same to the lower radiator and an upper punch element arranged to extend within the clamping frame and into the space inclosed by the said walls during the molding operation and cooperating with the die element.

11. A molding machine including a lower radiator having integral side and end walls, a clamping frame mounted upon the lower radiator and located within the space inclosed by the said walls and composed of side and end bars, the side bars being supported above and in spaced relation with the lower radiator, a plurality of die elements arranged within the clamping frame and having recessed terminal portions extending beneath the side bars, the recessing of the die elements also forming shoulders abutting against the inner faces of the said side bars and upper punch elements arranged to extend within the clamping frame and cooperate with the die elements.

12. A molding machine including a lower radiator having side and end walls, a clamping frame mounted upon the lower radiator and arranged within and fitting against the said side walls and composed of side and end bars, the side bars being supported above the radiator and in spaced relation with the same, a plurality of lower die elements mounted upon the lower radiator and having recessed terminals extending beneath the side bars of the clamping frame and secured by the same to the lower radiator, and upper punch elements extending within the said frame and cooperating with the die elements.

13. A molding machine including upper and lower radiators, a plurality of die elements mounted upon the lower radiator, a plurality of cooperating punch elements secured to the upper radiator, said punch elements being provided with sockets, upper pins depending from the upper radiator, lower pins carried by the lower radiator and engaged by the upper pins during the molding operation, and means for operating the die and punch elements.

14. A bakelite switch plate molding machine including upper and lower attachment frames, upper and lower radiators, a lower die element mounted upon the lower radiator, an upper punch element secured to the upper radiator and a plurality of punches consisting of upper vertical pins and mounted in the upper punch element and extending through and projecting below the same to engage the bakelite material, and punches consisting of lower vertical pins and projecting above the die element and cooperating with certain of the said upper pins.

In testimony whereof I have hereunto set my hand.

LAWRENCE S. SEYBOLD.